No. 689,248. Patented Dec. 17, 1901.
R. TIMM.
APPARATUS FOR AUTOMATICALLY MOISTENING SUBSTANCES.
(Application filed July 25, 1901.)
(No Model.)
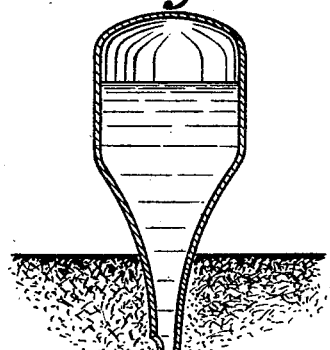
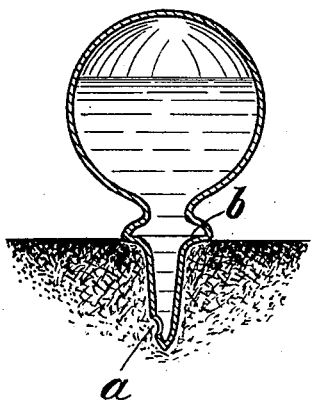
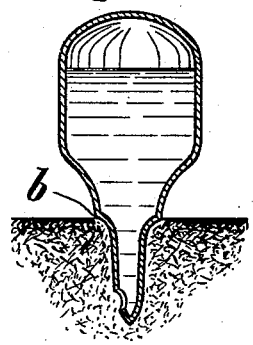
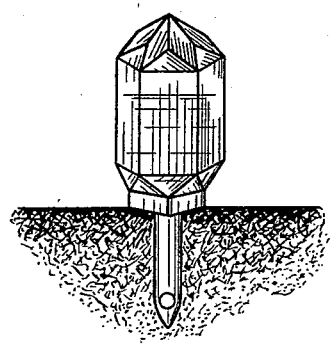
Witnesses
S. Brashears
W. C. Lyddane
Inventor
Rudolf Timm
by G. Dittman
Atty

UNITED STATES PATENT OFFICE.

RUDOLF TIMM, OF HANOVER, GERMANY.

APPARATUS FOR AUTOMATICALLY MOISTENING SUBSTANCES.

SPECIFICATION forming part of Letters Patent No. 689,248, dated December 17, 1901.

Application filed July 25, 1901. Serial No. 69,703. (No model.)

*To all whom it may concern:*

Be it known that I, RUDOLF TIMM, residing at 13 Oberstrasse, Hanover, in the Kingdom of Prussia, Empire of Germany, have invented new and useful Improvements in Apparatus for Automatically Moistening Substances, of which the following is a specification.

My invention relates to an improved apparatus for automatically moistening substances, and has for its object to keep granular, pulverulent, or porous substances continually soaked with a liquid.

This invention is more particularly designed for use in automatically watering potted plants and the like, and consists of a receptacle, of any desired form and material, which contains the liquid and is provided below with an outlet-pipe of such a size that the liquid will ooze out only under the capillary action of the substance to be moistened. In the side of this pipe I arrange an outlet-orifice in order that it may not become obstructed on the pipe being inserted into the substance. Its width and shape are such that after the receptacle has been filled the liquid will not pass out in the open air, but will leave only gradually after the insertion. A stop is provided on the pipe to determine the depth of insertion, as hereinafter described and claimed.

In the accompanying drawings I have represented several constructional forms of the improved apparatus.

Figures 1, 2, and 3 are longitudinal sections, and Fig. 4 a side elevation thereof, Figs. 1, 3, and 4 being intended to illustrate various forms of bodies and outlet-pipes, and Fig. 2 the complete device.

In the arrangement shown in Fig. 1 the receptacle has the shape of a bottle, the neck of which is provided laterally with an outlet-orifice $a$. This orifice is of such a shape and size that after the filling the water will not flow out on the bottle being turned upside down, but will ooze out only after the insertion of the neck into the earth in proportion to the receptivity of this earth. The place of the water oozing out is taken by air, which penetrates through the pores of the earth and rises in the form of little bubbles through the water. If the temperature of the room rises or the sun's rays act upon the bottle, the air contained in the bottle expands and forces out more water in accordance with the greater needs. It is expedient to make the bottle of transparent material, so as to enable the level of the water to be observed. When the apparatus is employed for watering potted plants, it renders the watering by hand superfluous, because it conducts the moisture to the plants according to exigencies, and such plant will not therefore be damaged by receiving too much or too little water.

In the arrangement represented in Fig. 2 the neck of the receptacle is furnished with a bulge $b$, which bears against the surface of the earth and prevents the neck being inserted too far. It serves at the same time to close up the earth which may have been opened by repeated insertions. This may also be obtained by tapering the pipe toward the outlet. Fig. 3 represents a similar bulge $b$ with the outlet-pipe tapered downward.

The receptacle may bear inscriptions, such as names of plants, and may have any desired external shape. Thus Fig. 4 shows the receptacle in the form of a crystal.

Having now described my invention, what I claim, and desire to secure by Letters Patent, is—

A plant-watering device comprising a main hollow body having a tapering hollow neck depending from its lower side adapted to be inserted in the earth, said neck being closed at its point and provided with a lateral opening near said point, and being distended at a point near the body to form a peripheral bulge to serve as a stop to limit its insertion into the earth, substantially as described.

In witness whereof I have hereunto signed my name, this 11th day of July, 1901, in the presence of two subscribing witnesses.

RUDOLF TIMM.

Witnesses:
CHARLES C. STEVENSON,
LEONORE RASCH.